(12) United States Patent
Smyth

(10) Patent No.: US 8,587,588 B2
(45) Date of Patent: Nov. 19, 2013

(54) RAY-AGGREGATION FOR RAY-TRACING DURING RENDERING OF IMAGERY

(75) Inventor: Evan P. Smyth, La Crescenta, CA (US)

(73) Assignee: DreamWorks Animation LLC, Glendale, CA (US)

( * ) Notice: Subject to any disclaimer, the term of this patent is extended or adjusted under 35 U.S.C. 154(b) by 736 days.

(21) Appl. No.: 12/543,389

(22) Filed: Aug. 18, 2009

(65) Prior Publication Data

US 2011/0043521 A1    Feb. 24, 2011

(51) Int. Cl.
*G06T 17/00* (2006.01)
(52) U.S. Cl.
USPC ............... 345/424; 345/419; 345/426
(58) Field of Classification Search
USPC .................... 345/426, 421; 700/98
See application file for complete search history.

(56) References Cited

U.S. PATENT DOCUMENTS

| 6,556,200 | B1 * | 4/2003 | Pfister et al. | 345/426 |
|---|---|---|---|---|
| 7,126,605 | B1 * | 10/2006 | Munshi et al. | 345/428 |
| 7,446,777 | B2 * | 11/2008 | Breneman | 345/581 |
| 7,548,238 | B2 * | 6/2009 | Berteig et al. | 345/426 |
| 7,868,891 | B2 * | 1/2011 | Wexler et al. | 345/503 |
| 2005/0041024 | A1 * | 2/2005 | Green et al. | 345/426 |
| 2005/0146522 | A1 * | 7/2005 | Maillot | 345/423 |
| 2007/0206008 | A1 * | 9/2007 | Kaufman et al. | 345/424 |
| 2008/0122838 | A1 * | 5/2008 | Hoover et al. | 345/420 |
| 2009/0073167 | A1 * | 3/2009 | Brown et al. | 345/421 |
| 2009/0096789 | A1 * | 4/2009 | Peterson et al. | 345/426 |
| 2009/0225080 | A1 * | 9/2009 | Keller et al. | 345/426 |
| 2009/0256836 | A1 * | 10/2009 | Fowler et al. | 345/419 |
| 2009/0284523 | A1 * | 11/2009 | Peterson et al. | 345/419 |
| 2010/0033493 | A1 * | 2/2010 | Nutter et al. | 345/589 |
| 2010/0064291 | A1 * | 3/2010 | Aila et al. | 718/104 |
| 2010/0168890 | A1 * | 7/2010 | Fisher et al. | 700/98 |
| 2010/0188403 | A1 * | 7/2010 | Mejdrich et al. | 345/426 |
| 2010/0194751 | A1 * | 8/2010 | Wald et al. | 345/426 |

OTHER PUBLICATIONS

Matt Pharr, Craig Kolb, Reid Gershbein, and Pat Hanrahan. 1997. Rendering complex scenes with memory-coherent ray tracing. In Proceedings of the 24th annual conference on Computer graphics and interactive techniques (SIGGRAPH '97). ACM Press/Addison-Wesley Publishing Co., New York, NY, USA, 101-108. DOI=10.1145/258734.258791 http://dx.doi.org/10.11.*

Paul Arthur Navratil, Donald S. Fussell, Calvin Lin, and William R. Mark. 2007. Dynamic Ray Scheduling to Improve Ray Coherence and Bandwidth Utilization. In Proceedings of the 2007 IEEE Symposium on Interactive Ray Tracing (RT '07). IEEE Computer Society, Washington, DC, USA, 95-104. DOI=10.1109/RT.2007.4342596 http://dx.doi.org/10.1109/RT.2007.43.*

(Continued)

*Primary Examiner* — Phi Hoang
(74) *Attorney, Agent, or Firm* — Morrison & Foerster LLP

(57) ABSTRACT

A computer-enabled method for rendering a scene of objects representing physical objects includes projecting a first plurality of rays against a scene and aggregating a second plurality of rays that intersect a bounding volume, wherein the bounding volume encloses an object of the scene, and wherein the second plurality of rays is a portion of the first plurality of rays. The method further includes determining or computing intersections of the second plurality of aggregated rays with the object when the number of the second plurality of aggregated rays exceeds a predetermined value. The method also includes rendering the scene based on the determined intersections of the rays with the object. The second plurality of rays may be aggregated in a bounding volume aggregate data structure for processing.

19 Claims, 7 Drawing Sheets

(56) References Cited

OTHER PUBLICATIONS

Steven Parker, William Martin, Peter-Pike J. Sloan, Peter Shirley, Brian Smits, and Charles Hansen. 1999. Interactive ray tracing. In Proceedings of the 1999 symposium on Interactive 3D graphics (I3D '99). ACM, New York, NY, USA, 119-126. DOI=10.1145/300523.300537 http://doi.acm.org/10.1145/300523.300537.*

* cited by examiner

RAY-AGGREGATION FOR RAY-TRACING DURING RENDERING OF IMAGERY

BACKGROUND

1. Field

This invention relates generally to computer graphics, and more specifically to computer systems and processes for rendering data to produce images.

2. Related Art

In computer graphics, rendering generally includes the process of generating a two-dimensional (2D) image using a model that describes three-dimensional (3D) objects within a scene. Many methods generating images of three-dimensional scene information have been developed. Primary among these are ray-tracing and scanline rendering, and an image renderer may employ a number of rendering methods, including aspects of both of these, to obtain a final image. Both ray-tracing and scanline rendering develop an image made up of rectangular samples called pixels, but each algorithm implements it in a different way, and each algorithm has virtues and drawbacks.

As shown in FIG. 1A, the ray-tracing approach generates an image by tracing the path of rays from a virtual camera through pixels in an image plane and then into the scene. Each ray is tested for intersection with the objects in the scene. If a ray hits a surface, the ray tracing algorithm traces through the reflected and/or refracted rays in addition to rays that sample the scene to capture secondary lighting effects, all of which may hit other surfaces in the scene. By recursively tracing all of these rays, a high degree of photorealism may be obtained. At each ray-intersection a shading operation may be performed in order to evaluate the correct color contribution due to that intersection.

While the ray-tracing algorithm projects rays from the virtual camera through the image plane into the scene against the direction of the light rays, a scanline algorithm projects objects from the scene onto the image plane in the same direction as the light rays as shown in FIG. 1B. The scanline algorithm then scan-converts the projected geometry/object and uses a Z-buffering scheme to keep track of which object is closest at each pixel in the image.

In general, ray-tracing techniques are preferred or even necessary in developing full global illumination solutions, which take into account not only primary visibility (light which comes directly from a visible object), but also secondary rays, such as reflections, refractions, and color bleeding (some even treat shadows as global illumination effects). Images rendered using global illumination algorithms often appear more photorealistic but they are more expensive in terms of computation time and memory. As a practical matter, many opt to determine primary visibility using scan-conversion techniques and then switch to raytracing to evaluate secondary effects.

Since each of ray-tracing and scanline rendering has strengths and weaknesses in different situations, images in modern computer graphics films are often created using hybrid rendering systems that use a scanline algorithm for "primary" visibility determination (determining which objects are directly visible) and a ray-tracing algorithm for "secondary" lighting in which rays are created dynamically to capture the secondary effects, such as soft shadows, ambient occlusion, diffuse effects (such as color bleeding), as well as other more sophisticated secondary lighting effects.

Generally and naïvely, ray-tracing can be implemented with the following pseudo-code:

```
For each pixel in the image
{
  Construct a ray from virtual camera through the pixel
  For each triangle in the scene
  {
    Determine if there is a ray-triangle intersection
    If there is an intersection
    {
      If the intersection is the closest intersection so far (Z-Buffer test)
      {
        Set the intersection as the closest intersection (Z-Buffer write)
        Shade the intersection
        Place the shaded color at the pixel location in the image
      }
    }
  }
}
```

In the pseudo-code above, a ray is projected through each pixel in the image. Each ray is tested against every small area (e.g., triangles or other shapes) in the scene for intersection, and the closest intersection for each ray is tracked. The disadvantage of this naïve approach is that it requires a huge number of intersection tests for each ray and can be inefficient and costly.

Different acceleration schemes for ray-tracing have been developed to reduce the number of intersection tests for a given ray, including bounding volume acceleration schemes as well as spatial subdivision schemes. In general, a bounding volume scheme encloses an object that is relatively complex with a simple bounding volume, such as a sphere, ellipsoid, or rectangular solid, whose intersection test is less expensive than that of the object itself. If a given ray does not penetrate the bounding volume, then it does not intersect the object contained within the volume, and an expensive ray-object intersection test can be avoided. The spatial subdivision scheme partitions a scene into sub-spaces based upon object locations according to a dynamically determined spatial hierarchy (such as one supplied by organizing objects into a kd-Tree). The number of ray-object intersection tests may be substantially reduced by limiting the tests to the objects that occupy the sub-space the ray is passing through.

Another acceleration scheme includes ray-bundling, which is a technique that processes rays as bundles, e.g., bundling a plurality of rays and testing each ray of the bundle of rays against common scenery objects. For instance, in ray-bundling, in order to guarantee that no intersections are missed, each of the rays within the bundle is checked against the union of all of the triangles that any ray, on its own, may hit. If two rays originate from approximately the same location and they both travel along more or less the same path, the algorithm tends to work fairly well. However, the more the two rays diverge, the greater the possibility that the algorithm will perform many ray-triangle intersection tests unnecessarily. Therefore, ray-bundling typically works well when the rays within the bundle are sufficiently coherent or similar to each other.

SUMMARY

According to some aspects of the inventions provided herein, processes and systems for animation rendering are provided. In one aspect provided herein, a computer-enabled method of rendering a scene of objects representing physical objects is provided. In one example, the process includes projecting a first plurality of rays against a scene and aggregating a second plurality of rays that intersect a bounding volume, wherein the bounding volume encloses an object of the scene, and wherein the second plurality of rays is a portion of the first plurality of rays. The process further includes determining or computing intersections of the second plurality of aggregated rays with the object when the number of the second plurality of aggregated rays exceeds a predetermined value. The process also includes rendering the scene based on the determined intersections.

The bounding volume may include a bounding box, a bounding sphere, a bounding ellipsoid, or the like. In some examples, the aggregated rays within a bounding volume may be stored in a bounding volume aggregate data structure or a general purpose data structure. Additionally, in some examples, computing intersections may include computing intersections using CPU vector-instructions.

In some examples, the method may further include aggregating at least a portion of the first plurality of rays intersecting a sub-region of the scene (e.g., a voxel), the sub-region comprising the bounding volume, and determining intersections of the second plurality of rays with the bounding volume when the portion of the first plurality of rays intersecting the sub-region exceeds a second predetermined value. The second plurality of rays may be stored within the aggregate data structure.

In other aspects, systems, apparatuses, and a computer-readable storage medium comprising computer-readable instructions for animation rendering are provided. For example, a computer-readable storage medium may include computer-readable instructions for rendering a scene of objects. The instructions may include projecting a first plurality of rays against a scene, aggregating a second plurality of rays that intersect a bounding volume, wherein the bounding volume encloses an object of the scene, and the second plurality of rays is a portion of the first plurality of rays. The instructions further including determining intersections of the second plurality of aggregated rays with the object when the number of the second plurality of aggregated rays exceeds a predetermined value. The instructions may further include rendering the scene based on the determined intersections.

BRIEF DESCRIPTION OF THE FIGURES

The present application can be best understood by reference to the following description taken in conjunction with the accompanying drawing figures, in which like parts may be referred to by like numerals.

DETAILED DESCRIPTION

Figure 1A:
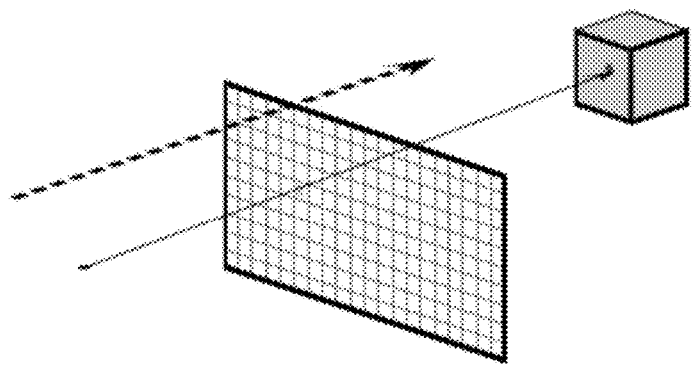
FIG. 1A illustrates an exemplary ray-tracing process, wherein rays are projected from a virtual camera through an image plane and then into the scene.
Figure 1B:
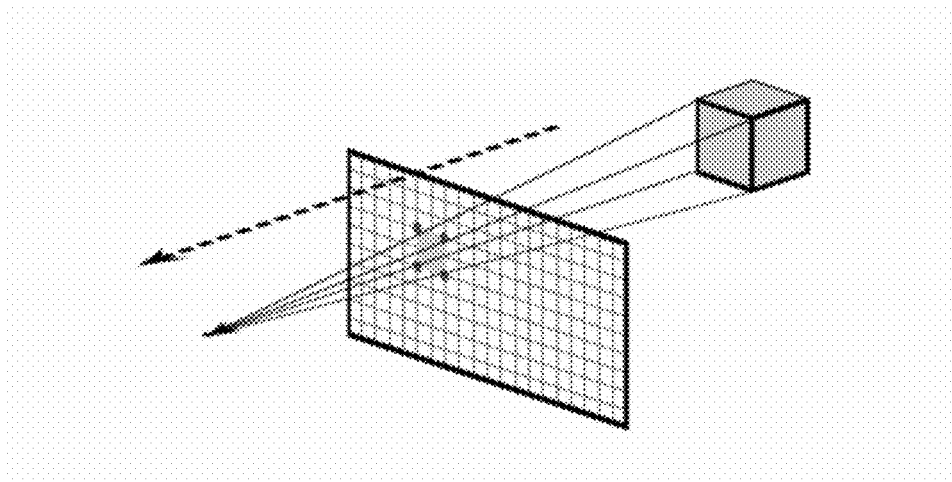
FIG. 1B illustrates an exemplary scanline rendering process, wherein objects are projected onto an image plane and scan-converted with depth-buffering.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

According to some aspects, systems and processes are provided for rendering scene data to produce images using ray-aggregation techniques. It should be recognized that the scene may include geometric objects and/or volumetric objects. The systems and processes may increase efficiency of a ray-tracing algorithm in different ways, including processing rays that are coherent or similar to each other, potentially increasing efficiency in the use of the memory system, making more effective use of vector instructions supported by SIMD (Single Instruction, Multiple Data) or vector processors, and the like.

Initially, an overview of exemplary systems and processes for ray-aggregation is provided. This is followed by descriptions of an exemplary flow chart and exemplary data structures for implementing the systems and processes. Additionally, distributed memory ray-tracing, an exemplary way for the processes/tasks to communicate with each other, is described.

In one example, an exemplary ray-aggregation process tests a ray against a piece of geometry/object only when the ray intersects a bounding volume enclosing the geometry/object (and not merely because other rays within a bundle are tested against the geometry/object in question as with ray-bundling techniques), and aggregates rays that intersect the common bounding volume for potentially more efficient processing. An exemplary ray-aggregation process may also reduce the amount of data that a host system needs to move across memory hierarchies in order to feed the computation engine. In effect, the process aims to have a more concentrated use of a smaller number of resources by re-organizing the computation. An exemplary ray-aggregation process may also take advantage of vector instructions supported by SIMD or vector processors. These vector instructions can process a vector of data at more or less the same speed as they can process a single piece of data. Because aggregated rays generally share common properties, a single instruction may be applied to process the rays simultaneously as a vector. These and other potential benefits of the ray-aggregation process will become apparent to those skilled in the art from the following more detailed description.

Figure 2:
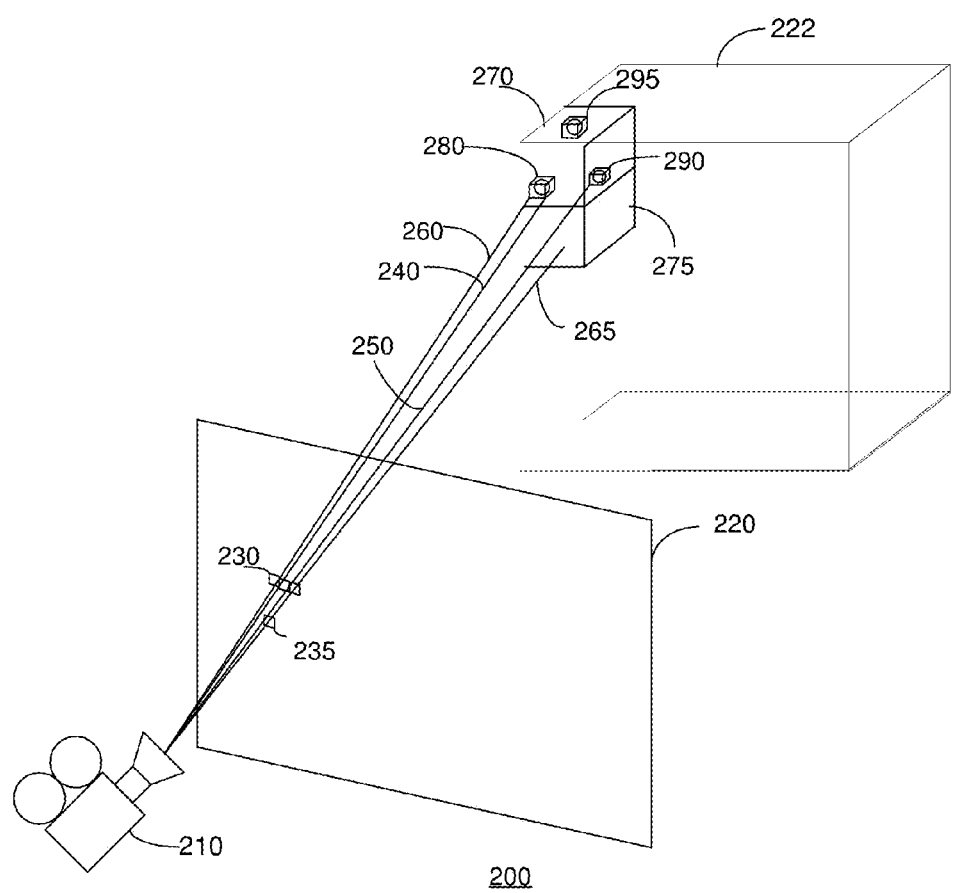
FIG. 2 illustrates a setup for an exemplary ray-aggregation process.

FIG. 2 is a diagram schematically illustrating an exemplary ray-aggregation process for generating a 2D image 220 using a model that describes 3D objects within a scene 222. As shown in FIG. 2, scene 222 may be divided into sub-regions, e.g., voxels. A voxel is a volume element representing a 3D sub-region on a 3D-grid in a 3D space. In some exemplary embodiments, the grid may be a regular grid in a 3D space. In some exemplary embodiments, the 3D scene may be subdivided using data structures such as kd-trees or octrees, instead of a regular grid. A voxel can be understood as a 3D pixel. It represents a quantity of 3D data just as a pixel represents a point or cluster of points in 2D data. Within voxel 270, there are shown three bounding volumes enclosing three 3D objects.

Image 220 is made up of pixels 230. For each pixel 230, a ray is projected from virtual camera 210 through pixel 230 and into scene 222. For example, ray 260 is projected through one pixel 230, and ray 260 intersects with voxel 270 (and ultimately, with bounding volume 280 enclosing a 3D object within scene 222). Similarly, rays 240 and 250 also intersect with voxel 270 (and ultimately, with bounding volumes 280 and 290 respectively through two different pixels).

Bounding volumes are used in this exemplary ray-aggregation process to improve efficiency by using simple volumes to contain more complex objects within scene 222. If a given ray does not intersect the bounding volume, it does not intersect the object contained in the bounding volume, and a ray-object intersection test can be avoided. For example, as shown in FIG. 2, any ray that does not intersect voxel 270 need not be tested against any of the bounding volumes fully contained in voxel 270 (bounding volumes may straddle voxel boundaries but this can be accounted for). Further, one level down, ray 250 does not intersect bounding volume 280 or 295, so testing ray 250 for intersection against the object(s) enclosed within the two bounding volumes becomes unnecessary. If a given ray does intersect the bounding volume, then the ray is tested for intersection against the object(s) enclosed within. For example, after rays 240 and 260 are determined to be intersecting bounding volume 280, both rays are further tested for intersection against the object(s) within.

Consider ray 265, which is projected through pixel 235 and enters the scene in voxel 275, which is empty. The process may determine where ray 265 exits voxel 275 and then what voxel ray 265 enters next. For example, if the next voxel is voxel 270, then the process may determine whether ray 265 intersects any bounding volumes in voxel 270.

As the rendering process is generating rays for intersection testing, these rays are transmitted into the scene. Rather than processing intersection tests immediately, rays are collected at the voxels where they first enter. Note that this would work for rays that are generated in the space as well, e.g., secondary rays. Once the number of the aggregated rays within a voxel exceeds a predetermined value, the aggregated rays are then processed against the bounding volumes contained in that voxel.

For example, in voxel 270, rays are aggregated at the next level of bounding volumes once it is determined which rays hit which bounding volumes and in what order. One of ordinary skill in the art will recognize that there are many optimizations possible for the order. As rays are collected at each bounding volume, the aggregated rays are then processed against the object(s) within each bounding volume. Rays are coalesced based upon their target, which is much more effective than being coalesced based upon their source and/or direction. It should be recognized that additional bounding volume hierarchies (or other hierarchies) may be added to this approach.

Testing for intersection against a bounding volume is also generally much faster than testing intersection against the object itself, because of the bounding volume's generally simpler geometry. It should be recognized that many types of bounding volumes may be employed, including sphere, ellipsoid, cylinder, cube, and the like. It is also contemplated that several types of bounding volume may be used in conjunction. The bounding volume may also enclose one or multiple objects.

In one exemplary ray-aggregation process, each voxel aggregates rays intersecting the particular voxel using a voxel aggregate data structure. When a voxel aggregate data structure becomes sufficiently full, the aggregated rays are then tested against the bounding volumes within the voxel for intersection, e.g., in some optimal order. Likewise, each bounding volume aggregates rays intersecting the particular bounding volume using a bounding volume aggregate data structure. For example, if one of the aggregated rays in the voxel hits a bounding volume, the ray will be dispatched to and stored in the bounding volume aggregate data structure.

It should be recognized that some exemplary embodiments may not have voxel aggregate data structures or bounding volume aggregate data structures for storing the aggregated rays. For example, the aggregated rays may be stored in one or more general purpose data structures.

At some point, a sufficient number of rays may be aggregated in a bounding volume aggregate data structure, and the controlling process may then place the geometry/object on a ready list for intersection tests. As machine resources become available, depending on the specific architecture, the controlling process may either retrieve the underlying geometry/object and handle the processing locally or notify the process managing that geometry/object to handle the processing. It is also contemplated that a mechanism may be required to flush the aggregated ray lists (i.e., process the aggregated ray lists) even if they are not full in order to complete the ray-tracing process.

In one exemplary embodiment, when a set of aggregated rays is ready to be processed, a thread or process may be dedicated to that task. The rays may then be communicated to another process that is managing the geometry/object in question, perhaps using Remote Direct Memory Access (RDMA). The ray-set may then be de-serialized, i.e., converted from a serial stream of bits to a meaningful memory representation and tested against the already resident geometry/object on that other process. Finally, the results of the intersection tests may be communicated back to the process that is the source of the ray-set. Alternatively, the geometry/object may be processed by a local co-processor, such as a GPU (Graphics Processing Unit) that supports full ray-triangle intersection work. These GPUs may also provide SIMD instruction sets for parallel processing of the geometry/object. In some embodiments, the geometry/object may be processed by a field-programmable gate array (FPGA).

If the number of rays is sufficiently great, the overhead of latency related to RDMA, the de-serialization, and the bus-transfer time may be amortized over the total work to be done. This may better amortize the costs of communication to and from the processing unit that will actually perform the computations. Further, this may enable more controlled uploading and downloading of reference data (geometry/objects) needed for fine-grained intersection and make more concentrated use of that data and thereby reduce the number of times the data must be moved close to the processor (a major performance drain). In addition, as more and more threads or processes are used, this approach enables much lower levels of synchronization across threads and may dramatically reduce the chance of the processes polluting each other's local memory.

Figure 3:
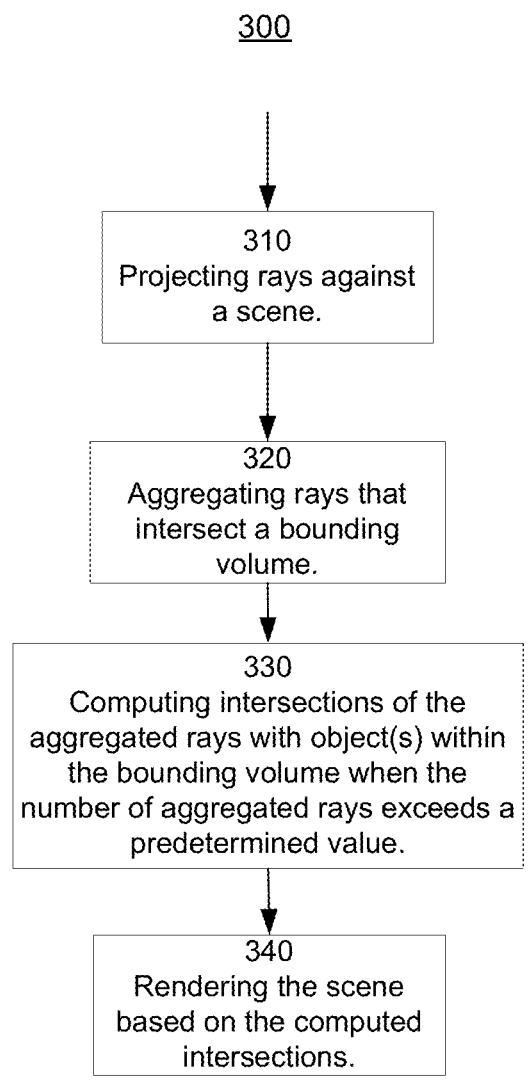
FIG. 3 illustrates an exemplary process for ray-aggregation and rendering a scene.

FIG. 3 shows an exemplary process 300 for ray aggregation. At 310, a plurality of rays are projected against a scene, e.g., as shown in FIG. 2. At 320, rays that intersect a bounding volume enclosing an object of the scene are aggregated, e.g., in memory. At 330, intersections of the aggregated rays with the object are computed when the number of the aggregated rays exceeds a predetermined value (which is a function of many parameters such as system resources and current workload etc). At 340, the scene is shaded based on the computed intersections. Shading may involve tracing secondary rays which will be inserted back in at 310.

It should be recognized that some of the acts described in process 300 may be performed in different orders or may be performed simultaneously. For example, 330 and 340 may be performed simultaneously, e.g., rendering portions of the scene as rays are being aggregating for other portions of the scene. It should also be recognized that the acts in process 300 may be repeated in a loop until the entire scene is rendered (for example, in the case of secondary rays).

Figure 4:
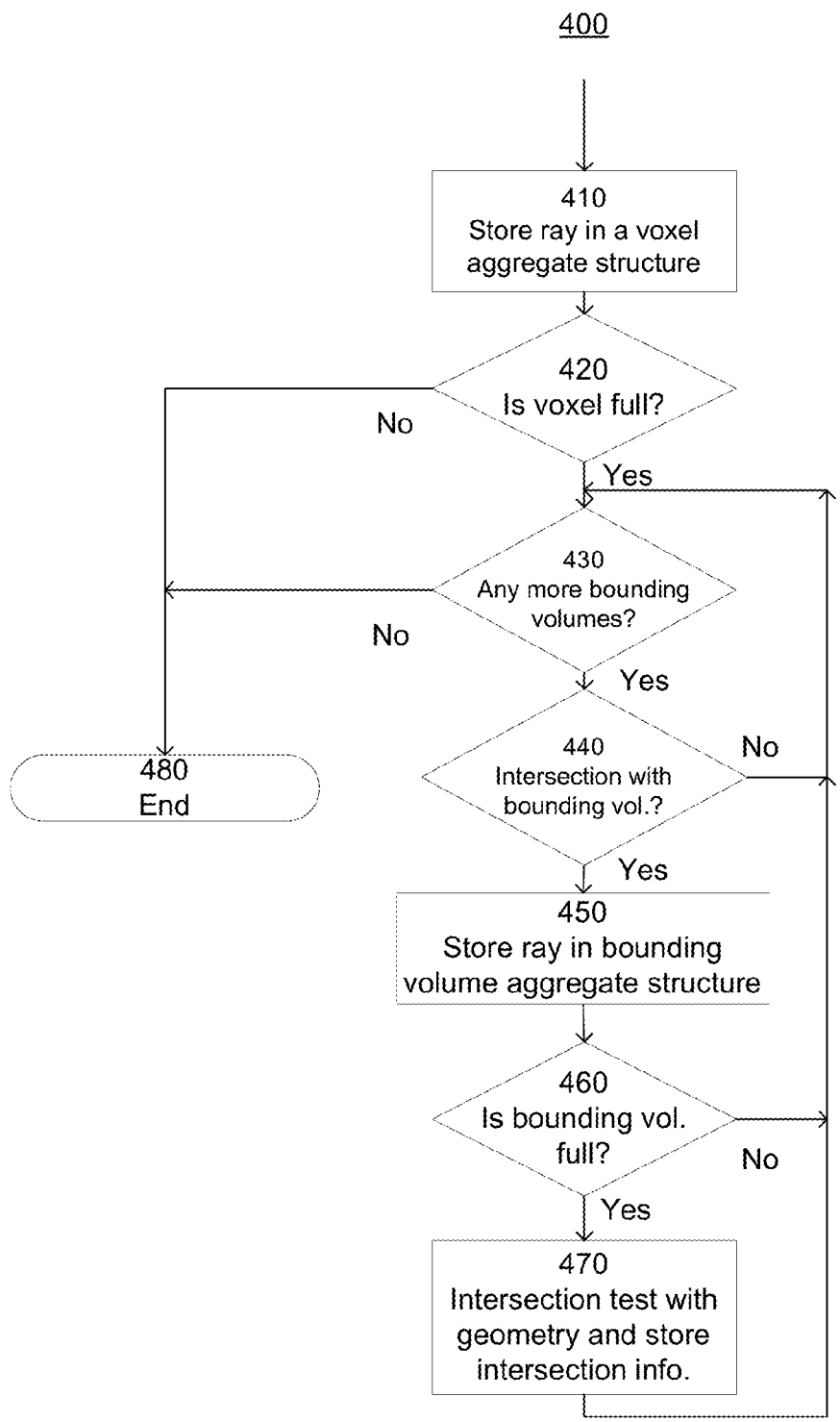
FIG. 4 illustrates an exemplary process for ray-aggregation and rendering a scene.

FIG. 4 shows another exemplary process 400 for ray-aggregation. The process handles a ray if it has been determined that the ray enters or originates from a particular voxel. It should be recognized that process 400 can be preceded by any number of processes performed as part of an animation process for a computer generated animation sequence. For example, in one preceding process, the background and the basic shapes of the characters and objects within the scene may be created. In another preceding process, the scene may be subdivided by a 3D grid, the objects within the scene may be identified, and a bounding volume may be created for each object. In yet another preceding process, primary rays are projected from the camera into the scene. Also, any number of processes may be performed subsequent to process 400 as part of the animation process for the computer generated animation sequence. For example, in one subsequent process, the nearest intersection is identified for each ray. In another subsequent process, secondary rays may be generated at the points of intersection and re-injected into process 400 in turn. In yet another subsequent process, shading may be evaluated. In yet another subsequent process, additional special effects may be added to the computer generated animation sequence and the rendered frames may be stored in a hard disk or an optical disk, incorporated into a motion picture film, or the like.

At 410, the ray that has been determined to enter or originate from a particular voxel is stored, for example, in a voxel aggregate data structure or a general purpose data structure. At 420, the process determines whether the voxel aggregate data structure is sufficiently full or has reached a predetermined value. If not, then the process terminates at 480. If yes, determinations 430 and 440 are made acting on all rays in the aggregate together. If the aggregate data structure contains a sufficient number of rays, then the process determines at 430 the bounding volume within the voxel to be processed next. If there are no more bounding volumes to be processed, then the process terminates at 480. Otherwise, the process determines at 440 whether each ray intersects with the current bounding volume. If there is no intersection with the current bounding volume, then the process proceeds to 430 and again determines the bounding volume within the voxel to be processed next. Otherwise, the process stores the ray in the current bounding volume aggregate data structure at 450. Next, (for each bounding volume) the process determines at 460 whether the bounding volume aggregate data structure is sufficiently full. If the aggregate data structure is not sufficiently full, then the process proceeds to 430 and again determines the bounding volume within the voxel to be processed next. Otherwise, the process executes an intersection test against the geometry/object associated with the bounding volume and stores the intersection information accordingly at 470. Then the process again proceeds back to 430 and again determines the bounding volume to be processed next.

Figure 5A:
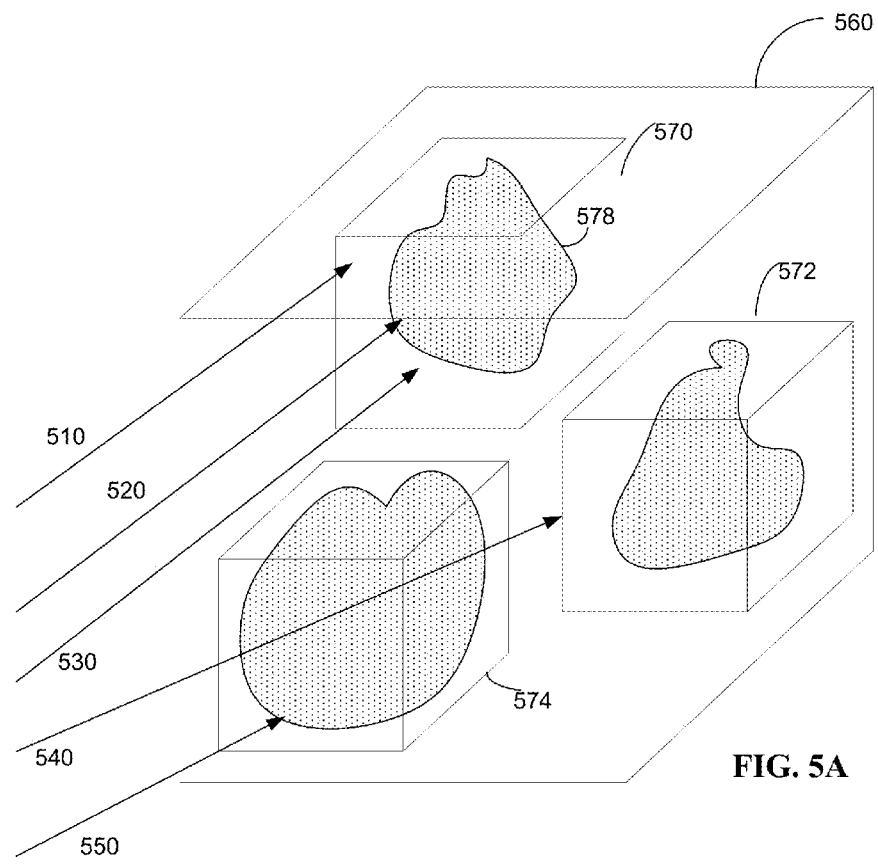
FIG. 5A illustrates an exemplary voxel enclosing a number of bounding volumes and their corresponding objects.
Figure 5B:
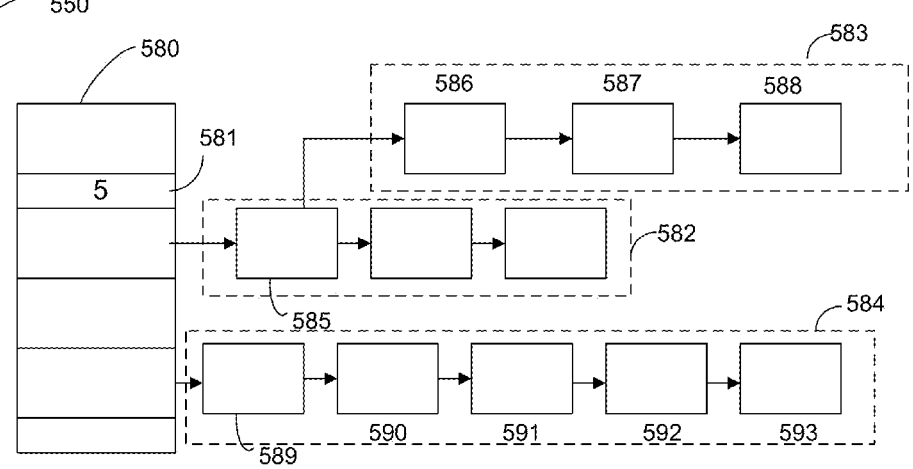
FIG. 5B illustrates an exemplary voxel aggregate data structure.

Next, an exemplary data structure for the ray-aggregating process is described. To aid the understanding of the exemplary data structure, FIG. 5A shows an exemplary voxel 560 enclosing bounding volumes 570, 572, and 574 and their corresponding objects. FIG. 5B shows voxel aggregate data structure 580, which is an exemplary data structure for storing the information related to voxel 560. One of the fields in voxel aggregate data structure 580 is field 581, which is used to indicate the total number of rays intersecting voxel 560. As shown in FIG. 5A, there are a total of 5 rays (510, 520, 530, 540, and 550) that intersect voxel 560. Therefore, the number five would be stored in field 581 of voxel aggregate data structure 580. Voxel aggregate data structure 580 also maintains a list 584, which is a list of the five rays that intersect voxel 560. Voxel aggregate data structure 580 also maintains a list 582, which is a list of the three bounding volumes within voxel 560.

When voxel aggregate data structure 580 becomes sufficiently full (determined primarily by analysis of run-time conditions, for example), the aggregated rays in list 584 are then tested against the bounding volumes within the voxel in list 582 for intersections. For example, rays 510, 520, and 530 intersect bounding volume 570, and therefore, these rays are stored in bounding volume aggregate data structure 585 as list 583. In some implementation, list 583 may not be stored as a sub-data-structure as shown but rather data-structure 585 may have its own first-class aggregate data-structure similar to 580. To save memory, it is contemplated that the common rays in list 584 and list 583 may share the same memory space by using a different set of pointers for each list. It should also be recognized that different data structures may be used to implement the lists; for example, a simple linked list, a skipped list, or other structures that are optimized for fast node retrieval, insertion, and deletion may be employed.

Figure 6:
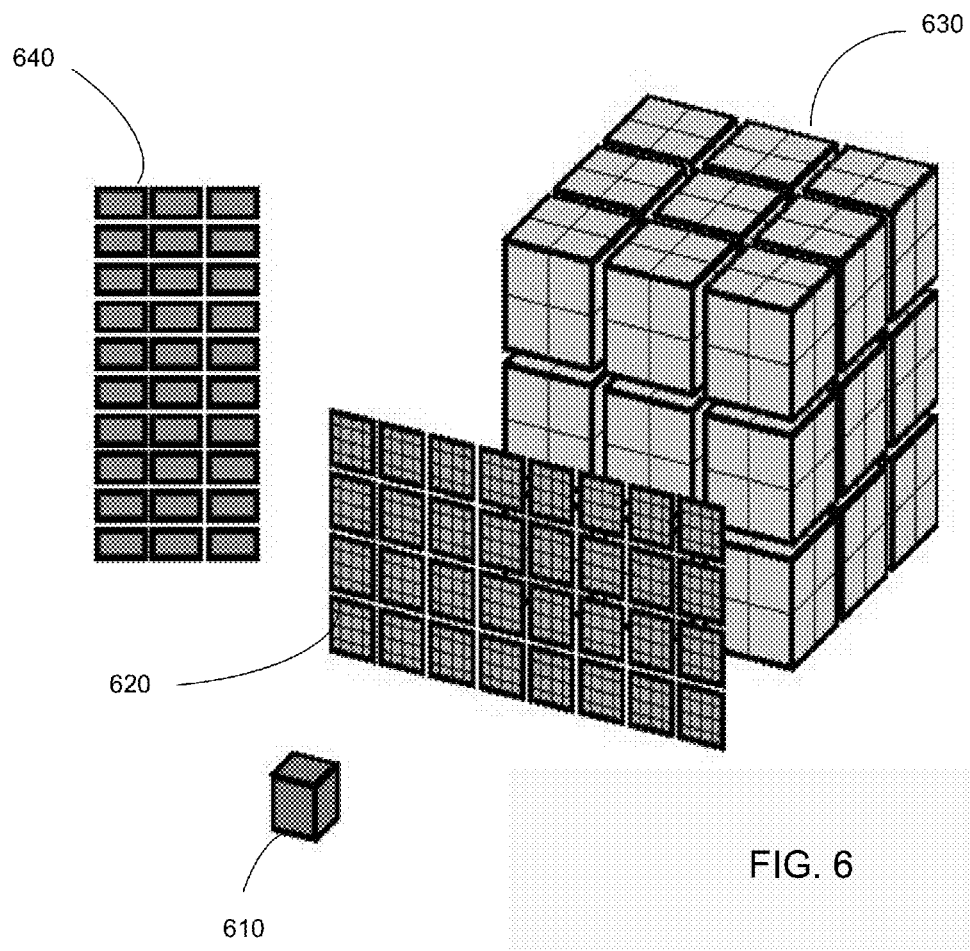
FIG. 6 illustrates an exemplary communication structure for the processes to communicate with each other for rendering a scene.

FIG. 6 illustrates an exemplary distributed memory ray-tracing process implementing the ray-aggregation invention: an exemplary process for the processes to communicate with each other. In one exemplary embodiment, the ray-aggregation process is based on a client-server model, with the client and the server each running in separate processes and connected by a standard Unix socket. The client application is devoted to the user interface required for controlling a renderer and the server is devoted to creating the requested rendered images.

In one exemplary embodiment, there are four Message Passing Interface (MPI) intra-communicators, along with inter-communicators between pairs of these intra-communicators. MPI is a specification for an API that allows many computers to efficiently communicate with one another, while the intra and inter-communicators enable the system to more selectively broadcast collections of rays between nodes. It should be recognized that while these communicators are depicted as distinct processes, in part because it makes the server-side implementation substantially simpler to describe, the intra-communicators do not need to be distinct processes.

The first intra-communicator is called MPI_MSTR_COMM. It contains only one process, Master Process 610, as shown in FIG. 6. Master Process 610 controls the renderer. It receives commands from a separate client process, processes these commands, and then launches renderers as needed and relays the resulting imagery back to the client. Master Process 610 may be thought of as the camera interface.

The second intra-communicator is called MPI_TILE_COMM. It contains a number of processes, each of which is responsible for rendering a rectangular sub-region of the virtual film-back representing the final rendered image, e.g., a tile. Each of the Tile Processes 620 as shown in FIG. 6 generates primary rays from the camera through each film-back location in the particular tile and into the scene. Each Tile Process 620 also manages the final results (in terms of color and opacity) returned by the renderer after processing each ray. These results are relayed to Master Process 610 for subsequent assembly and transmission to the client.

The third intra-communicator is called MPI_GRID_COMM. It contains a number of processes, each of which is responsible for managing a voxel. Each of the Grid Processes 630 as shown in FIG. 6 contains bounding volume information for each piece of geometry/object that is within or intersects the voxel. As Tile Processes 620 project rays from the camera into the scene, the rays are broadcast to MPI_GRID_COMM using the appropriate inter-communicator. Each Grid Process 630 knows the boundary of the voxel it is responsible for, as well as which of the boundaries of the voxel are shared with other Grid Processes 630. In an alternative implementation, it would be possible to pre-determine which voxel a ray will first enter and to thus address that ray at that voxel directly (point-to-point) rather than broadcasting it to all voxels. Thus, as a ray enters a voxel or as a secondary ray is generated within a voxel, the appropriate Grid Process 630 may be selected to process the ray based upon which boundary the ray crosses in order to enter a voxel, or based upon the origin of the secondary ray.

The fourth and final intra-communicator is called MPI_GEOM_COMM. It contains a number of processes, each of which is responsible for managing a subset of the scene geometry/objects. Each of the Geometry Processes 640 as shown in FIG. 6 is assigned a list of geometry/objects. Each process receives point-to-point communication from the Grid Process 630 that manages the bounding volumes of the same geometry/object (thus, each bounding volume in each voxel has knowledge of which remote process manages its underlying representation). The communication contains those rays that have been identified by the Grid Process 630 as requiring intersection test against the geometry/object. Each Geometry Process 640 determines whether the rays actually hit the geometry/object in question and relays that determination back to the Grid Process 630 that requests the check. As each Grid Process 630 receives such intersection information from each Geometry Process 640, it keeps track of which intersection is closest based upon intersection testing so far.

Another function of the Geometry Process 640 is to receive a message from the Grid Process 630 that a particular intersection with a geometry/object was the closest. At that point, the Geometry Process 640 can shade the intersection that was found and it generates secondary rays as needed in order to sample the scene from that intersection point. These secondary rays are sent directly back to the Grid Process 630 for further processing as all of these secondary rays must have originated at the intersection point which must clearly be in the same region.

The high-level ray management in the system centers on the Grid Processes 630. For a ray that is determined to be in a particular Grid Process 630 region, that process determines which, if any, of the bounding volumes its region contains are intersected by the ray. If memory permits, these bounding volumes may be stored in a list that is sorted by the distance from the ray origin to the bounding volume intersection. In an alternative approach, a number or pre-determined bounding volume orders can be developed that exploit such ray-invariants as the principal direction component (signed direction of the largest direction component of the ray: six are possible) and rays can be further aggregated based upon this principal component and tested in-order against the appropriate order list of bounding volumes.

For each bounding volume that is hit, the ray is sent to the Geometry Process 640 that manages the geometry/object in that bounding volume. When the Geometry Process 640 receives the ray, it determines whether there is an intersection. Once a ray has been processed asynchronously against the geometry/object in question, the intersection information (with the possibility that there was no intersection) is relayed back to the Grid Process 630. If there is no hit or if it is further away than a hit that has been computed for a prior bounding volume, then the Grid Process 630 requests a test with the next most likely bounding volume. When the Grid Process 630 finishes with a particular ray, it will have determined whether there is a hit or not. A ray that has no hits is relayed to the appropriate neighboring Grid Process 630 (i.e., the one that the ray will enter when leaving the voxel). For a ray that hits a geometry/object, ownership of the ray is relayed to the Geometry Process 640 that manages that geometry/object to shade and thus generate all the secondary rays required to sample the scene from the point of intersection. These secondary rays are relayed back to the Grid Process 630 that identified the intersection and these rays are processed. Once the system has processed these rays deeply enough, a termination condition may be triggered causing no further next-generation rays to be generated.

Once all secondary rays have been processed, shading is possible at the point of intersection. The Geometry Process 640 runs the shader assigned to that surface using the surface information as well as the lighting information relayed though the secondary ray return colors.

Many of the techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 7:
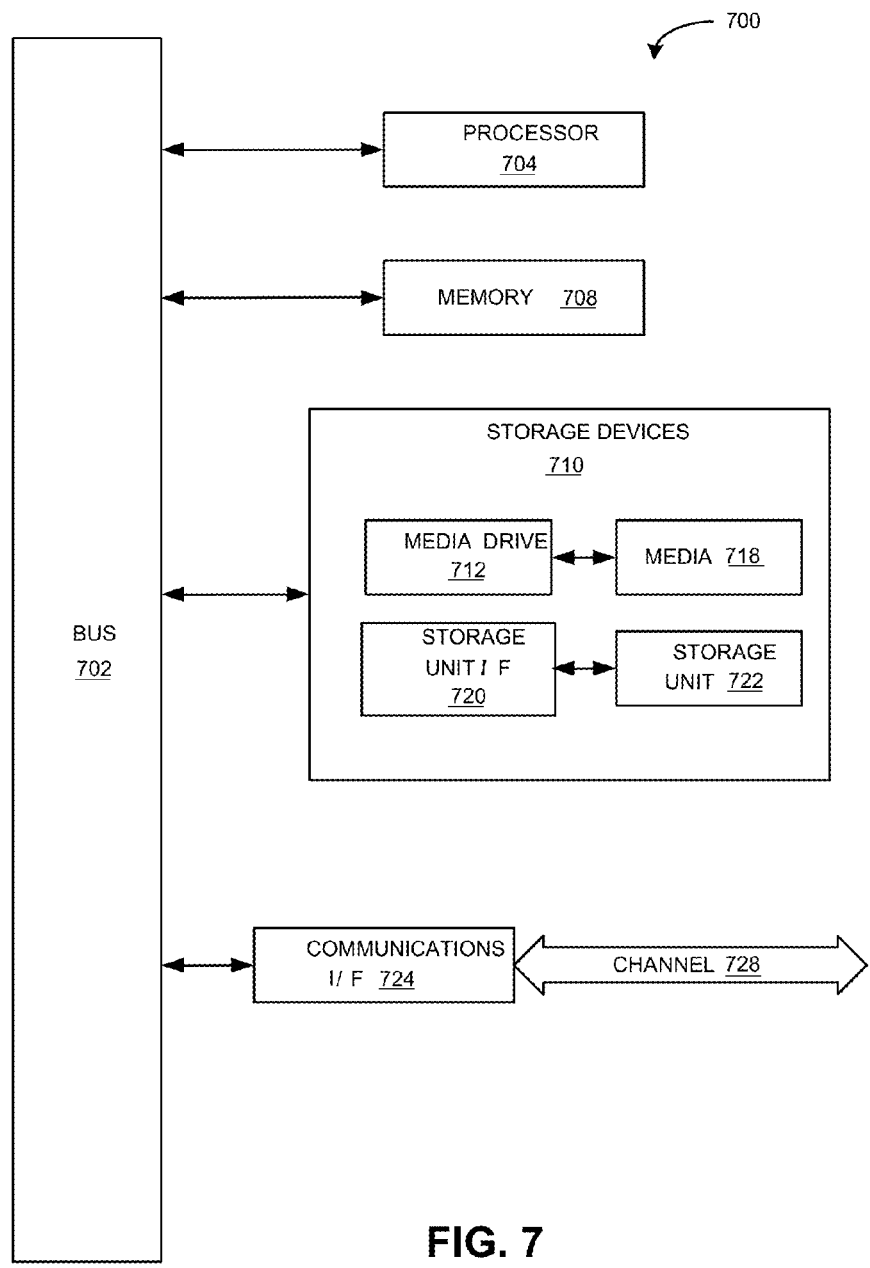
FIG. 7 illustrates an exemplary computing system that may be employed to implement some or all processing functionality in certain embodiments of the invention.

FIG. 7 illustrates an exemplary computing system 700 that may be employed to implement processing functionality for various aspects of the invention (e.g., as a SIMD device, client device, server device, one or more processors, or the like). Those skilled in the relevant art will also recognize how to implement the invention using other computer systems or architectures. Computing system 700 may represent, for example, a user device such as a desktop, mobile phone, personal entertainment device, DVR, and so on, a mainframe, server, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, preferably random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage mechanism 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having stored therein particular computer software or data.

In alternative embodiments, information storage mechanism 710 may include other similar instrumentalities for allowing computer programs or other instructions or data to be loaded into computing system 700. Such instrumentalities may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 722 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical, or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 708, storage device 718, storage unit 722, or signal(s) on channel 728. These and other forms of computer-readable media may be involved in providing one or more sequences of one or more instructions to processor 704 for execution. Such instructions, generally referred to as "computer program code" (which may be grouped in the form of computer programs or other groupings), when executed, enable the computing system 700 to perform features or functions of embodiments of the present invention.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed:

1. A computer-enabled method of rendering a scene of objects representing physical objects, the method comprising:
projecting a first plurality of rays against a scene;
aggregating at least a portion of the first plurality of rays that intersect a sub-region of the scene, the sub-region comprising a bounding volume;
determining intersections of the at least a portion of the first plurality of rays with the bounding volume in response to the portion of the first plurality of rays intersecting the sub-region exceeding a second predetermined value;
aggregating a second plurality of rays that intersect the bounding volume, wherein the bounding volume encloses at least one object of the scene, and wherein the second plurality of rays is a portion of the first plurality of rays;
determining intersections of the second plurality of aggregated rays with the at least one object in response to the number of the second plurality of aggregated rays exceeding a predetermined value; and
rendering the scene based on the determined intersections.

2. The method of claim 1, wherein aggregating the second plurality of rays comprises aggregating the second plurality of rays in a bounding volume aggregate data structure.

3. The method of claim 1, wherein determining intersections comprises computing intersections using vector instructions.

4. The method of claim 1, wherein determining intersections comprises computing intersections on at least one of a graphics processing unit (GPU), or a field-programmable gate array (FPGA).

5. The method of claim 1, further comprising storing the portion of the first plurality of rays within an aggregate data structure.

6. The method of claim 1, wherein aggregating the portion of the first plurality of rays within a sub-region of the scene comprises aggregating the rays in a voxel aggregate data structure, which maintains a list comprising the bounding volume.

7. A non-transitory computer-readable storage medium comprising computer-executable instructions for rendering a scene of objects representing physical objects, the instructions comprising:
projecting a first plurality of rays against a scene;
aggregating at least a portion of the first plurality of rays intersecting a sub-region of the scene, the sub-region comprising a bounding volume;
determining intersections of the at least a portion of the first plurality of rays with the bounding volume in response to the portion of the first plurality of rays intersecting the sub-region exceeding a second predetermined value;
aggregating a second plurality of rays that intersect the bounding volume, wherein the bounding volume encloses at least one object of the scene, and wherein the second plurality of rays is a portion of the first plurality of rays;
determining intersections of the second plurality of aggregated rays with the at least one object in response to the number of the second plurality of aggregated rays exceeding a predetermined value; and
rendering the scene based on the determined intersections.

8. The non-transitory computer-readable storage medium of claim 7, wherein aggregating the second plurality of rays comprises aggregating the second plurality of rays in a bounding volume aggregate data structure.

9. The non-transitory computer-readable storage medium of claim 7, wherein determining intersections comprises computing intersections using vector instructions.

10. The non-transitory computer-readable storage medium of claim 7, wherein determining intersections comprises computing intersections on at least one of a graphics processing unit (GPU), or a field-programmable gate array (FPGA).

11. The non-transitory computer-readable storage medium of claim 7, further comprising instructions for storing the portion of the first plurality of rays within an aggregate data structure.

12. The non-transitory computer-readable storage medium of claim 7, wherein aggregating the portion of the first plurality of rays within a sub-region of the scene comprises aggregating the rays in a voxel aggregate data structure, which maintains a list comprising the bounding volume.

13. Apparatus for rendering a scene of objects representing physical objects, the apparatus comprising:
a memory configured to store ray intersection data; and
a computer-readable medium having computer-executable instructions for:
projecting a first plurality of rays against a scene;
aggregating at least a portion of the first plurality of rays intersecting a sub-region of the scene, the sub-region comprising a bounding volume;
determining intersections of the at least a portion of the first plurality of rays with the bounding volume in response to the portion of the first plurality of rays intersecting the sub-region exceeding a second predetermined value;
aggregating a second plurality of rays that intersect the bounding volume, wherein the bounding volume is associated with at least one object of the scene, and wherein the second plurality of rays is a portion of the first plurality of rays;
determining intersections of the second plurality of aggregated rays with the at least one object in response to the number of the second plurality of aggregated rays exceeding a predetermined value; and
storing the determined intersections.

14. The apparatus of claim 13, wherein the computer-readable medium further comprises instructions for rendering the scene based on the determined intersections.

15. The apparatus of claim 13, wherein aggregating the second plurality of rays comprises aggregating the second plurality of rays in a bounding volume aggregate data structure.

16. The apparatus of claim 13, wherein determining intersections comprises computing intersections using vector instructions.

17. The apparatus of claim 13, wherein determining intersections comprises computing intersections on at least one of a graphics processing unit (GPU), or a field-programmable gate array (FPGA).

18. The apparatus of claim 13, wherein the computer-readable medium further comprises instructions for storing the portion of the first plurality of rays within an aggregate data structure.

19. The apparatus of claim 13, wherein aggregating the portion of the first plurality of rays within a sub-region of the scene comprises aggregating the rays in a voxel aggregate data structure, which maintains a list comprising the bounding volume.

* * * * *

UNITED STATES PATENT AND TRADEMARK OFFICE
CERTIFICATE OF CORRECTION

PATENT NO.         : 8,587,588 B2                                        Page 1 of 1
APPLICATION NO.    : 12/543389
DATED              : November 19, 2013
INVENTOR(S)        : Evan P. Smyth It is certified that error appears in the above-identified patent and that said Letters Patent is hereby corrected as shown below:

In drawing sheets, Sheet 7 of 7, FIG. 7, in Reference Numeral 720, line 2, Delete "I F" and insert -- I/F --, therefor.

Signed and Sealed this
Fifteenth Day of April, 2014

Michelle K. Lee
*Deputy Director of the United States Patent and Trademark Office*